United States Patent [19]

Briem et al.

[11] 4,376,750

[45] Mar. 15, 1983

[54] METHOD FOR SEPARATING AND REMOVING A MOLDED ELEMENT FORMED BY FIRING AND PYROPLASTIC ADHESION OF THE MATERIAL FROM A MOLD

[75] Inventors: Karl Briem, Wuppertal-Barmen; Hanno Laurien, Brunswick, both of Fed. Rep. of Germany

[73] Assignee: Zytan Thermochemische Verfahrenstechnik GmbH & Co. KG, Brunswick, Fed. Rep. of Germany

[21] Appl. No.: 144,913

[22] Filed: Apr. 29, 1980

[30] Foreign Application Priority Data

May 2, 1979 [DE] Fed. Rep. of Germany ....... 2917646

[51] Int. Cl.$^3$ .......................... B28B 13/00; B29C 7/00

[52] U.S. Cl. ................................. 264/336; 249/66 R; 264/43; 425/351; 425/436 R; 425/438; 425/444

[58] Field of Search ......................... 264/334, 336, 43; 249/66, 69, 76, 75, 77; 425/88, 126, 350, 351, 422, 436, 444, 438

[56] References Cited

U.S. PATENT DOCUMENTS

| | | | |
|---|---|---|---|
| 802,848 | 10/1905 | Dunn | 249/66 |
| 1,335,071 | 3/1920 | Moussette | 425/350 |
| 1,717,676 | 6/1929 | Garvin et al. | 249/75 |
| 3,745,201 | 7/1973 | Sundermann et al. | 264/43 |
| 3,792,962 | 2/1974 | Briem | 432/101 |
| 3,796,539 | 3/1974 | Sundermann | 432/96 |
| 3,811,815 | 5/1974 | Sundermann et al. | 425/453 |
| 3,851,038 | 11/1974 | Meyer | 264/334 |

FOREIGN PATENT DOCUMENTS

| | | |
|---|---|---|
| 1914372 | 9/1969 | Fed. Rep. of Germany . |
| 2155933 | 11/1971 | Fed. Rep. of Germany . |

*Primary Examiner*—Willard E. Hoag

*Attorney, Agent, or Firm*—Montague & Ross

[57] ABSTRACT

Mold elements, generally composed of clay, are removed from the mold by pressing the body upwardly with a wedging action.

4 Claims, 10 Drawing Figures

METHOD FOR SEPARATING AND REMOVING A MOLDED ELEMENT FORMED BY FIRING AND PYROPLASTIC ADHESION OF THE MATERIAL FROM A MOLD

FIELD OF THE INVENTION

The invention relates to a method of separating and removing a molded element, formed by firing and pyroplastic adhesion of the material, more particularly clay which is capable of expanding, from a mold which encloses it. The mold has a base with a grid-like surface for supporting the material, formed from grid bars or otherwise penetrated to allow the material to be fired to be acted upon by hot gases flowing through the material, and a structure forming the side walls which is preferably separate from the base.

BACKGROUND OF THE INVENTION

Ceramic firing techniques are known in which the material to be fired, especially clay which is capable of expanding, is placed in firing molds preferably in the form of granulates or pellets and is heated therein until melting and softening of the material as well as pyroplastic adhesion takes place, (German Pat. No. 1 914 372) at least at the surface of the material to be further fired at high temperature.

In order to be able to manufacture these bodies, firing molds have become known which are sufficiently heat-resistant and capable of withstanding changes in temperature and in which there are no significant contact reactions or chemical bonding with the material to be fired (German Offenlegungsschrift No. 21 55 933). However, despite careful selection of the material and shaping of the parts of the firing mold, bonding phenomena due to rough machining or moistening of the components of the mold by molten portions in the material cannot be entirely eliminated. These phenomena which occur, particularly in the case of localized overheating, lead to impurities or completely ruin the firing molds with respect to their further use and moreover lead to considerable difficulties in removing the molded body from the mold after the firing process has been terminated, i.e. in separating the molded body from the parts of the mold without damage or without parts of the material to be further fired sticking to the mold.

The above-mentioned bonding phenomena stops when the material is cold or during the cooling-off process of the material and in fact stops solely due to the differing thermal contraction of the material and the firing mold when a temperature has been reached which is below the quartz transition temperature of the material. However, for economic reasons, it is advisable to remove the material at as high a temperature as possible since if the firing mold is allowed to cool reheating of the mold is necessary during the following firing process and this leads to considerable loss of energy and restrictions in the material used as the mold material.

If removal from the mold is carried out bearing in mind the cost efficiency at high temperature, there is the difficulty of removing the molded body from the firing mold without irreparable damage, thereto if in some circumstances due to local overheating at areas of contact with the material and the mold, the mold has been moistened by the viscous material and bonding to the mold takes place. A further difficulty of removal of the body from the mold arises from the fact that the softened molded body catches mechanically on the component parts of molds having more complicated mold components.

Practical tests have shown that the bonding forces which arise due to moistening or catching may be so large that the body cannot be removed from the firing mold by lifting or sliding without damaging the areas of contact.

OBJECTS OF THE INVENTION

The object of this invention is to so design the method described in the introduction that the material to be fired may be removed from the mold despite the difficulties mentioned above resulting from local moistening of a viscous and bonding material against overheated areas of contact and/or mechanical catching of the molded body on the component parts of the mold, without permanent damage to the molded body or mold and without residues of the material to be fired, which restrict re-use of the mold, being stuck to the mold.

SUMMARY OF THE INVENTION

In order to achieve the above object, the method is characterized by the fact that the molded body is pressed upwards from below and raised from the bars by means of plastic deformation, in the region between its surfaces bearing on the bars of the base, starting from one end of the bars and progressing longitudinally along the bars, thus forming a wedge-shaped and broadening clearance progressing along the surface of the body bearing on the bars.

The invention is based on the knowledge that the bonding forces due to catching from poor machining or moistening are small in terms of each unit of area. For this reason, release of the molded body is brought about in small areas of the contact surface, one after the other, so that only small forces are required for this separation. In molds with side walls separate from the base, there is no difficulty in separating the structure of the mold forming the side walls from the fired molded body, preferably by lifting the structure, which is at an angle normal to the base, because this structure may be cooled during the firing process and thus the bonding phenomena between the molded body and the structure is safely eliminated. However, this is not the case in the region of the base provided formed by the grid bars, because the heated gases have to be passed through the clearance areas between the grid bars into the material to be fired, so that cooling of the base is out of the question.

In the new method, release of the molded body from the base is always carried out along a line which passes in a longitudinal direction along the grid bars. The formation of the wedge-shaped clearance due to separation and the separation of the moulded body from the base, which is effective along a line, is facilitated by the still plastic condition of the molded body. The deformation occurring at this time in the still plastic molded body disappears again without any great difficulty after opening the mold and removing the molded body from the mold without there being any areas of damage on the molded body.

Formation of the wedge-shaped and broadening clearance which progresses along the surface of the molded body bearing on the grid bars may be effected in different ways.

It is particularly advantageous if the molded body is subjected to the action of combined lifting and advancing forces in the region between its under surfaces and the grid bars of the base in the manner of a peeling process.

In another type of separation, provision is made for the molded body to be raised from the bars in the manner of a lifting process when using a mold having a base comprising grid bars, by means of combined lifting and advancing forces acting on the molded body at its region between the bars. Here it is not a question of a peeling process but rather of raising the molded body from the grid bars when, in conjunction with the still plastic deformability of the molded body, separation takes place in each case along a line transverse to the grid bars and this line forms the leading edge of the wedge-shaped and broadening clearance.

The devices suitable for implementation of the method may have different design and construction. A preferred embodiment of the apparatus according to the invention is so constructed that a platform-like arrangement for receiving and supporting the mold is provided in a housing on a structure support, the housing preferably having heat-insulating/cladding. Latterally of, or beneath the platform-like arrangement there is provided a separating tool which may be either laterally or vertically displaceable between the bars of the grid-like base, the separating tool having support surfaces facing the underside of the molded body, the support surfaces forming an acute angle with the abovementioned underside of the molded body until it is raised from the bars of the mold.

In the devices mentioned having a separating tool which may be laterally re vertically displaced the molded body is supported by the separating tool at the same time as it is raised from the grid bars, so that it rests on this separating tool and may be pushed away or raised from the separating tool in order to be transferred to a subsequent treatment station.

When the molded body is to be separated from the grid bars in the manner of a peeling process, the separating tool comprises substantially horizontal plates which may be displaced in parallel with and longitudinally along the grid bars of the mold, one end of these plates being connected in an articulated manner to a transverse bar engaged by a piston cylinder arrangement and which plates have a wedge portion at the other end and prongs forming the leading edge of the wedge portion and engageable between the bars.

In a feature of the separating tool mentioned above, the areas which sag downwardly due to softening of the molded body between the grid bars, are supported and raised by the tool during the separation process, so that the mechanical bonding and catching of the body is released, while at the same time the contact surfaces of the molded body and the grid bars are separated by means of the wedge portions in a peeling process.

In order to achieve safe guidance of the separating tool during the peeling process, despite the deformation of the grid bars, occuring due to thermal stress, more particularly alternating thermal stress, which causes changes in the spacing between the grid bars in the separating tool mentioned above provision is made for the transverse bar to be guided at its ends in fixed tracks of a support and for each plate to have a longitudinal groove with a tapered portion pointing towards the prongs, into which longitudinal groove a fixed guide extension engages beyond the tapered portion with a degree of play. As a result, it is ensured that the separating tool is retained in its starting position with parallel plates until transition into the separating position, when the prongs are engaged between the grid bars and guided thereby into such a position that the prongs remain between the grid bars and slide along the wedge portions of the plates on the grid bars.

If instead of separating the molded body in the manner of a peeling process it is intended to raise the molded body from the grid bars, then in another embodiment of the invention, the separating tool comprises a vertically displaceable block having a plurality of upright parallel blades with inclined leading edges facing the underside of the molded body and which are engageable between the grid bars through the grid clearances. A separating tool of this type lifts the molded body from the grid bars along a line advancing over the grid surface while utilizing the pyroplastic deformablity of the molded body, so that at the end of the process the molded body rests on the blades of the block extending through the grid clearances and may be slid off or raised from the blade portions. As a result of the inclined leading edges of the separating tool, the wedge-shaped separating clearance mentioned at the outset, advancing along the contact surface of the grid bars is formed between the underside of the molded body and the contact surface of the grid bars.

Instead of the vertically displaceable block, in another embodiment of the invention, the separating tool may comprise a block pivotable about an axis transverse to the longitudinal direction of the bars, the block having blade portions engageable between the grid bars and through the grid clearances. The mode of operation of such a separating tool is the same as already described above in conjunction with the vertically displaceable block.

In order to avoid faults in the subsequent firing and mold opening process resulting from residues of the previously-removed molded body which may have stuck to the grid bars after that molded body had been removed, the platform-like arrangement provided for supporting the mold is pivotally mounted about an axis running transverse to the longitudinal direction of the grid bars and may be transferred from a horizontal mold bearing position into a tilted position restricted by a stop with the aid of a pivot drive. Thus the grid bars forming the base of the mold and the base frame may be pivoted against the stop with suitable vigor when being transferred into the tilted position, in order to release any residues of the molded body which had previously been removed which may still be adhering to the base and to remove them as well as any loose particles lying on the base before refilling the mold once the base has been returned to its horizontal bearing position and the raised mold structure has been lowered.

BRIEF DESCRIPTION OF THE DRAWING

The above and other objects, features and advantages of the invention will become more readily apparent from the following description, reference being made to the accompanying drawing, in which.

SPECIFIC DESCRIPTION

Figure 1:
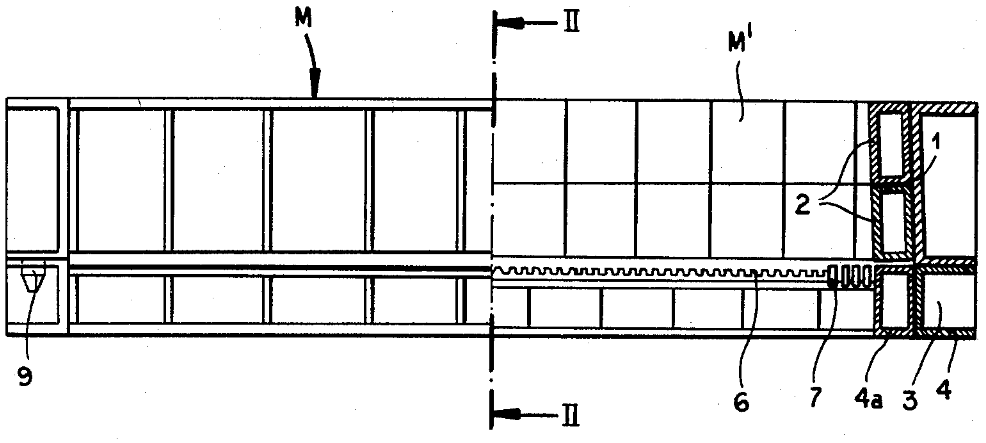
FIG. 1 is a front view of the mold partly in section according to the invention.
Figure 2:
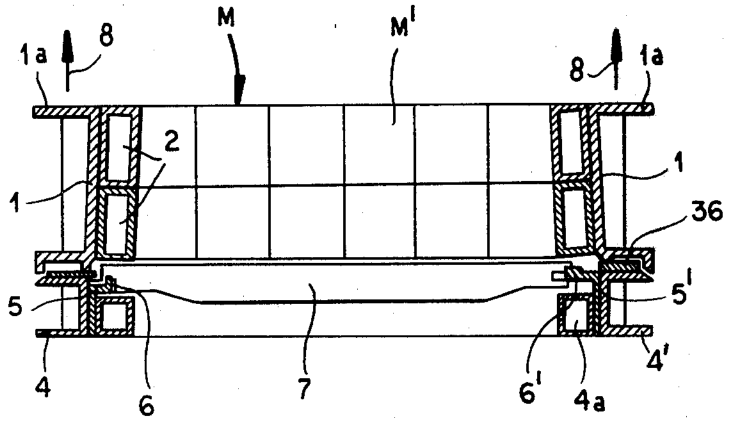
FIG. 2 is a sectional view through the mold taken along line II—II of FIG. 1.

The mold M according to FIGS. 1 and 2 has an upper frame structure 1 forming the side walls thereof, the structure 1 being equipped on the inside with hollow profile blocks 2 which serve for the purpose of insulation and through which a cooling medium may flow if necessary.

The base 3 of the mold M is located beneath the structure 1 and is equipped with a lower frame structure 4 and blocks 4*a* which have hollow profiles and are in turn arranged on the inside of the structure 4. Supports 5 and 5′ are arranged on the inside of the structure 4 i.e. on the opposite longitudinal sides of the base 3 and these supports 5 and 5′ form respective toothed border regions 6 and 6′ at their ends facing the blocks 2. The grid bars 7 within the base 3 of the mold M are engaged by these toothed border regions and are suspended as shown in FIG. 2 so that they are expandable in length relative to the supports 5 and 5′. For this reason the grid bars as shown in FIG. 2 only engage a small amount of the toothed border regions 6′ in their cold condition. When the grid bars 7 expand under heat, the bars may undergo a sliding movement in accordance with their longitudinal expansion in the toothed border region 6′ on the right-hand side of FIG. 2.

The structure 1 of the mold M with the hollow profile blocks 2 fixed thereto may be raised from the base 3 of the mold M in the direction of arrows 8 and is positioned on the base 3 of the mold by means of centering pins 9.

Structure 1 which encloses an upwardly inwardly tapering mold chamber M′ has an upper flange 1*a* by which the structure may be gripped in order to be raised in the direction of arrows 8, once a molded body made from a ceramic material has been finished in the closed mold by firing and pyroplastic adhesion with the aid of a heated gas passed through the base between the grid bars 7.

Figure 3:
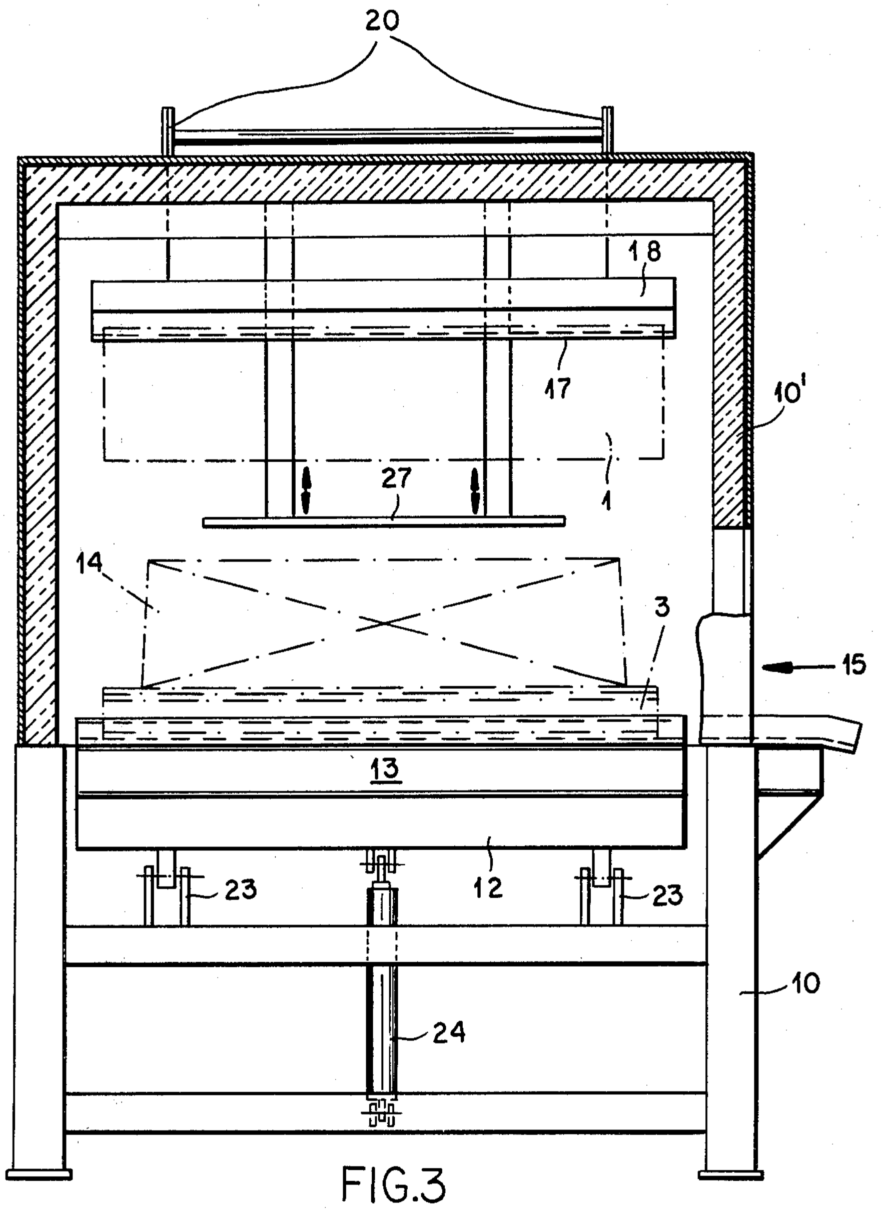
FIG. 3 is a front view partly in section of the apparatus for opening and closing the mold.
Figure 4:
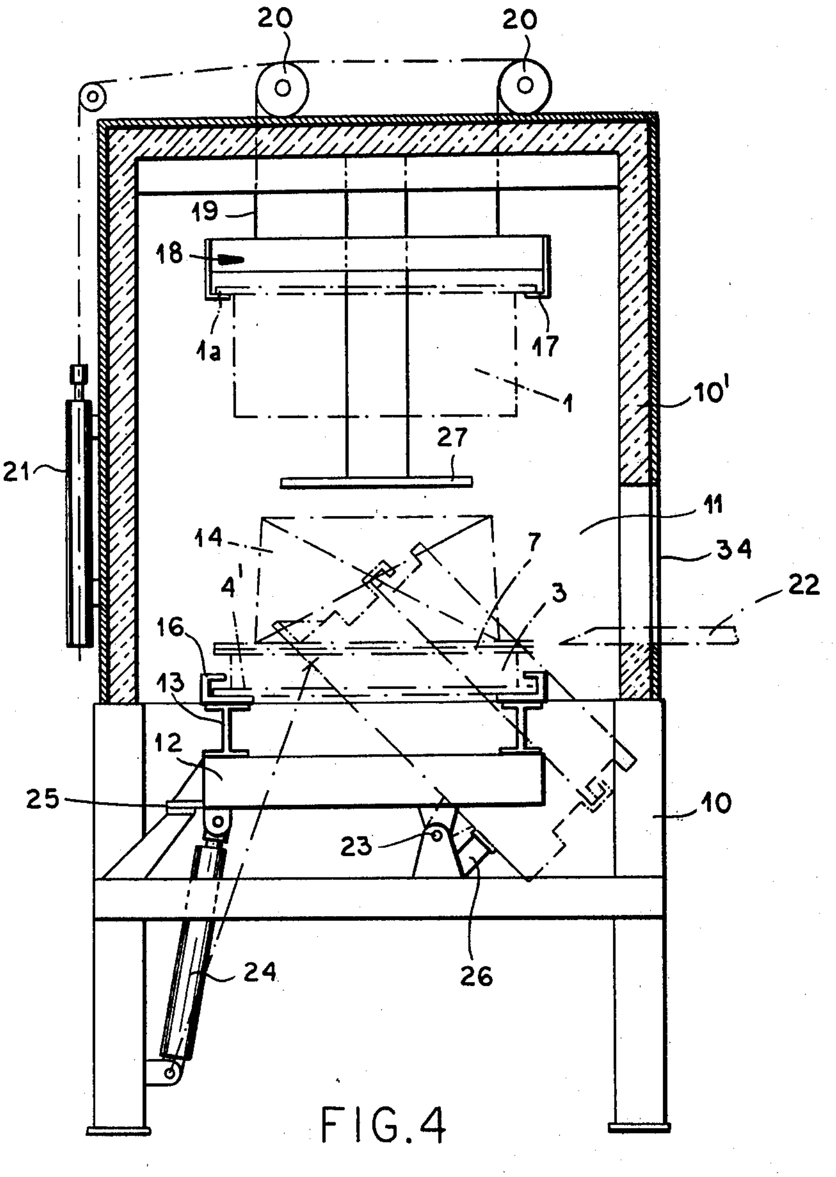
FIG. 4 is an end view partly in section of the apparatus shown in FIG. 3.

In order to remove a molded body, the mold M shown in FIGS. 1 and 2 is inserted into the device shown in FIGS. 3 and 4. The mold M is shown only schematically in phantom lines in these Figures with the mold parts shown in their separated position, i.e. the frame structure 1 is located in its position raised from the base 3 of the mold M.

The apparatus for opening and closing the mold M according to FIGS. 3 and 4 comprises a framework 10 upon which a heat-insulated housing 10′ is mounted with a chamber area 11 formed within the housing in which a platform 12 is retained, the platform arrangement having support and retention members 13 which serve to receive the mold M together with the molded body 14 located therein. Thus the mold M is inserted laterally into the chamber 11 in the direction of the arrow 15 so that the base 3 of the mold M is retained in the guides 16 arranged on the members 13 of the platform 12. The guides 16 thus enclose the lower flange 4′ of the base 3 of the mold M so that the base 3 of the mold is only retained on the platform 12 so as to be displaceable either in the direction of the arrow 15 or opposite thereto.

The upper flanges 1*a* of the structure 1*a* engage with flanges 17 of a lifting device 18 as the mold M is inserted into the apparatus as shown in FIGS. 3 and 4, the lifting device 18 comprising drag chains 19 as well as guide wheels 20 and hydraulic drive means 21. With the aid of this lifting device 18 the upper frame structure 1 is raised away from the molded body 14. There are no difficulties here since bonding of the molded body to the structure 1 is effectively eliminated because the structure 1 may be cooled by the internal arrangement of the hollow blocks 2, sufficiently enough to safely avoid bonding adhesion between the molded body 14 and the structure despite heating of the molded body to the point of pyroplastic adhesion.

The molded body 14 resting on the base 3 of the mold M or on the grid bars 7 may now be separated from these grid bars inside the housing 10′, as shown in FIGS. 3 and 4. A horizontally displaceable separating tool 22 may be seen schematically in phantom lines in FIG. 4, designed for this purpose and described in detail in connection with FIGS. 5 and 6.

The apparatus according to FIGS. 3 and 4 is made so that the platform 12 is rotatable about a pivot 23 so that, once the molded body 14 has been removed from the mold, the platform 12 and the grid bars 7 may be transferred into the inclined position shown in broken lines in FIG. 4. In order to achieve this, a pivot drive in the form of a piston 24 engages the end of the platform remote from the pivot 23, the piston 24 being relieved of load when the platform 12 is in its position of rest or its starting position by the fact that the rests on a stop 25. Pivoting of the platform may take place up to a stop 26 against which the platform may be moved at a predetermined speed with the aid of the piston 24 so that the platform and the grid bars 7 undergo a vibration which releases any residues of fired material which may still be stuck to the grid bars after the molded body has been removed. The loose residue of material which may remain on the grid is slid off by inclined positioning of the platform and falls downwardly out of the apparatus according to FIGS. 3 and 4.

In order to safely prevent the molded body 14 from being carried along when raising the structure 1 of the mold M an abutment plate 27 is provided in the apparatus according to FIGS. 3 and 4, the abutment plate 27 being mounted so as to be adjustable in height and may be lowered to the surface of the molded body 14 when raising the structure 1 and subsequently raised from the molded body again.

Figure 5:
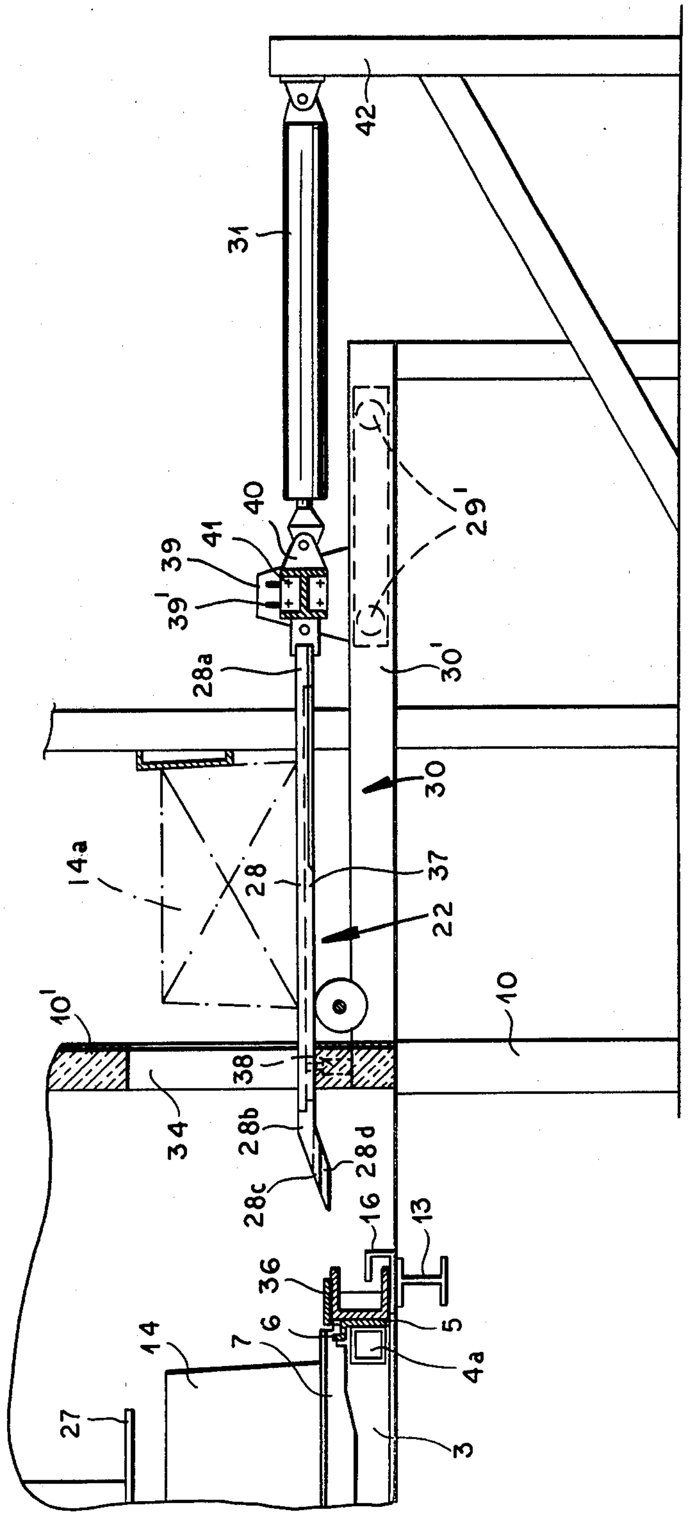
FIG. 5 is a side view with parts broken away of the separating device according to the invention.
Figure 6:
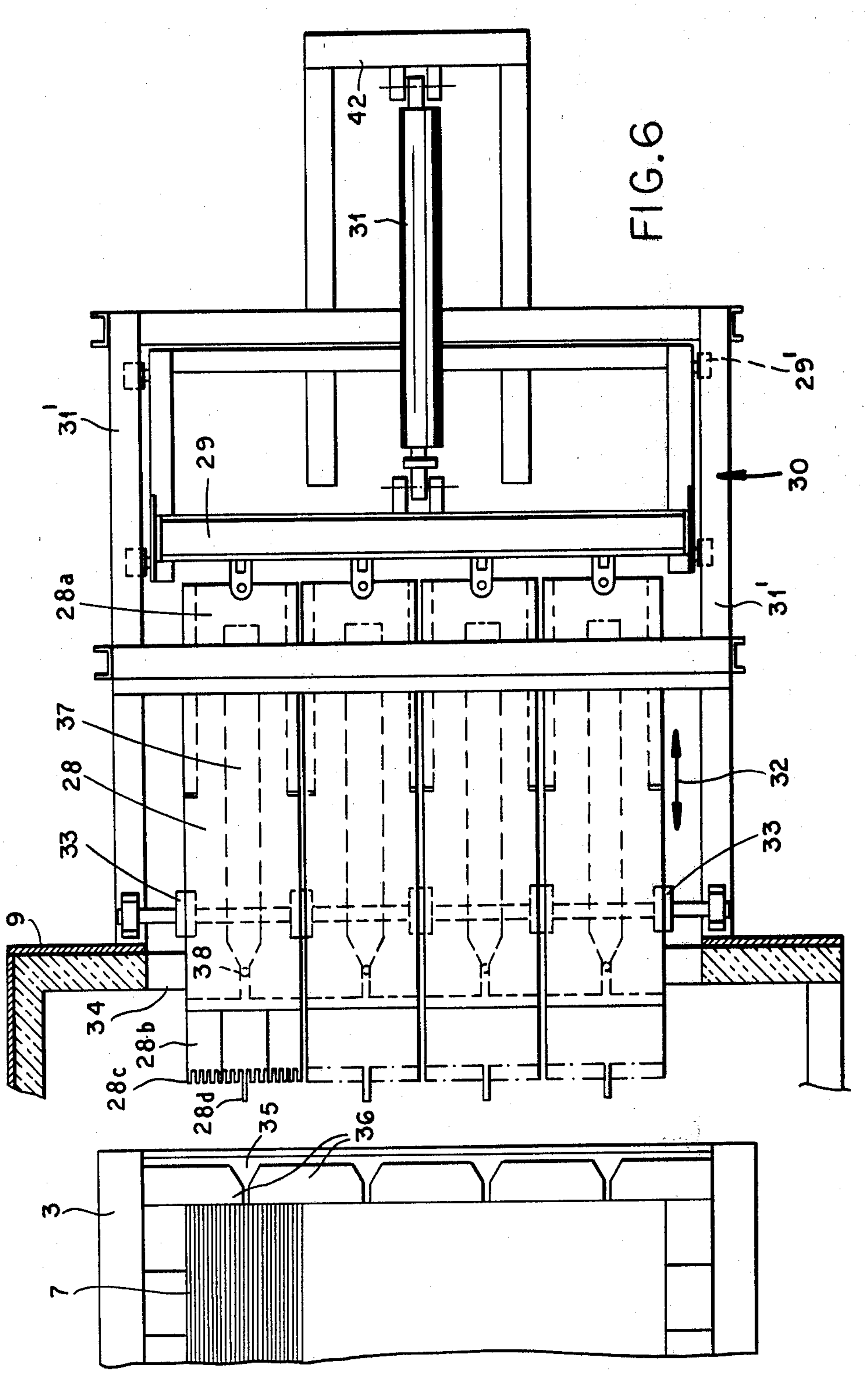
FIG. 6 is a plan view of the device shown in FIG. 5.

The separating device 22 for removing a molded body from the mold base shown in FIG. 4 may be seen in its entry and mode of operation in FIGS. 5 and 6.

The device 22 comprises, in accordance with the invention, a series of plates 28 which may be displaceable in one plane, parallel to the grid bars 7. One end 28*a* of the plates 28 is connected in an articulated manner to a transverse bar 29 which in turn is guided via guide rollers 29′ in a support 30 comprising a pair of U-shaped channels 30′. An advancing drive in the form of a piston 31 engages the transverse beam 29 so that the plates 28 are movable backwards and forwards in the direction of the double arrow 32. Thus the plates 28 are supported on rollers 33 which are arranged on an axle mounted on the support 30.

The plates 28 extend through a window 34 in the housing 10' and have wedge portions **28*b* at their ends remote from the points of articulation, the wedge portions 28*b* being fixed to the plates 28. The wedge portions 28*b* merge into prongs 28*c* which are provided for extending into the intermediate areas between the grid bars 7 of the lower frame 4 of the mold M a guide prong 28*d*, which is extended and projects beyond the prongs 28*c* is provided on each plate 28 or on one of the wedge portions 28*b* connected to the plate 28 and projects beyond the prongs 28*c* not only in length but also downwardly. These guide prongs 28*d* cooperate with guide grooves 35 which are formed between the guide components 36 on the lower frame 4** of the mold.

In each of the plates 28, a longitudinal groove 37 has been cut on the underside thereof, the groove cooperating with a fixed guide extension arranged in the lower edge of window 34. The grooves 37 are tapered at their ends facing the prong **28*c* so that in the retracted position of the plates 28, as shown in FIG. 6, these plates take up a position parallel with each other and thus have a defined starting position. When the plates 28 are advanced with the aid of piston 31, the fixed guide extension, in the form of a guide pin 38, reaches the broadening region of the guide grooves 37 so that the plates 28 are able to perform a lateral pivoting motion limited by the groove 37 and the guide extension 38. This is necessary if deformation of the grid bars occurs from the tension and expansion due to heat and the clearances between the grid bars are no longer completely in parallel. The lateral pivoting allows the prongs 28*c* of the plates 28 to reach into the clearance areas between the grid bars 7 during deformation or slight lateral displacement of the grid bars 7 and ensures the safe guidance of the plates 28 by the guide prongs 28*d* in cooperation with the guide grooves 35 formed between the components 36 of the base 3. During the advance of the plates 28, the wedge portions 28*b* reach beneath the molded body resting on the grid bars 7 while the prongs 28*c* extending between the grid bars 7 with their wedge surfaces, ensure that the molded body is separated from the grid bars, including the portions sagging between the grid bars due to heat-related plastic deformation. A kind of peeling away process of the molded body takes place, this peeling away and separating of the molded body being completed along a line transverse to the grid bars as a result of the still plastic condition of the molded body, the line advancing in the same direction as the grid bars in accordance with the advance movement of the plates 28 until the entire molded body rests on the plates 28** and has been raised from the grid bars. Thus, any possible sticking of the molded body to the grid bars is eliminated.

The molded body 14 is now transferred into the position **14*a*, which may be seen in FIG. 5, on the return movement of the plates 28** and is removed therefrom transverse to their longitudinal extension.

The transverse beam 29, to which the plates 28 are fixed in an articulated manner, is retained so as to be adjustable on height in the support 30 in order to correct any possible vertical misalignment with grid bars 7 by the vertical plates 39 having vertical grooves 39' formed therein and guide extensions 41, which are indicated only schematically, engaging the grooves 39'. The transverse bar 29 is connected midway between the plates 39 to the piston 31 by a pivot 40. The piston cylinder arrangement 31 is retained on an abutment block 42 in pivotable manner at its end remote from the plates 28, the abutment block 42 being anchored in the foundation of the location in which the device shown in FIGS. 5 and 6 is erected.

Figure 7:
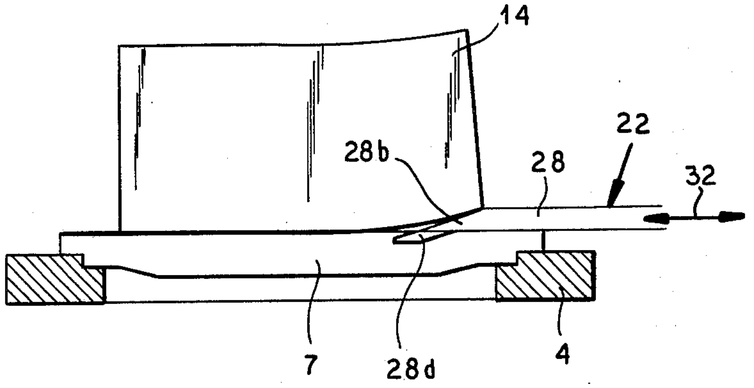
FIG. 7 is a diagrammatic view of the molded body being removed from the mold base by the separating device shown in FIGS. 5 and 6.

The device shown in FIGS. 5 and 6 is shown only schematically in FIG. 7. The molded body 14 rests on the grid bars 7 which are retained in turn on the frame 4 of the base 3 of the mold M in the manner already described. The separating tool 22, which is displaced in the direction of the double arrow 32 and which comprises plates 28 with the wedge-shaped portions **28*b* and the guide prongs 28*d*, already partially engages the molded body 14. Thus the prongs 28*d* and 28*c* pass between the adjacent grid bars 7 and in this way force the material, which has penetrated between adjacent grid bars 7 as a result of the softened condition of the molded body, in an upward direction while at the same time a clearance between the lower surface of the molded body 14 and the upper surface of the grid bars 7 is produced by the wedge portion 28*b*, the clearance moving forward as the separating tool 22 advances towards the other end of the molded body 14 so that the molded body is separated from the grid bars 7 by utilizing the slight deformation possible due to its pyroplastic condition effectively along a line moving in a direction longitudinally as the grid bars. Thus, there are no large forces required to separate the molded body from the grid bars 7**, even if localized overheating and moistening of the grid bars at individual points has caused the material of the molded body to stick firmly and tenaciously.

Figure 8:
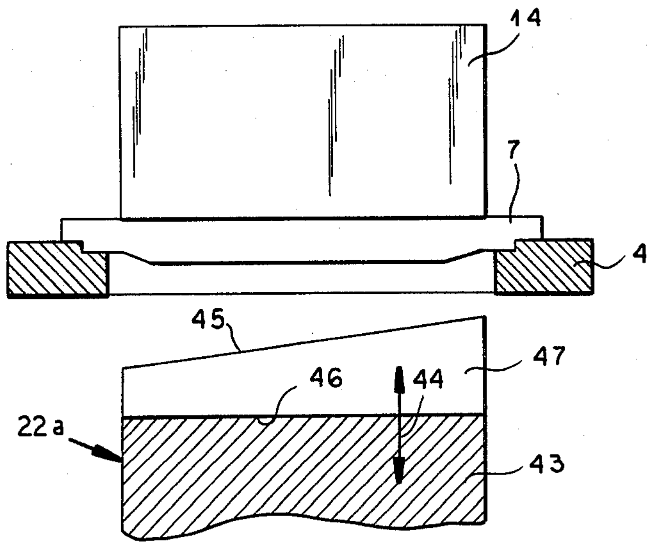
FIG. 8 is a diagrammatic view similar to FIG. 7 showing a separating device according to another embodiment of the invention.

FIG. 8 shows another possible embodiment of the separating tool which is designated in this example as **22*a*. The view of FIG. 8 corresponds to that of FIG. 7 as far as it relates to the molded body, the grid bars 7 and the frame 4 of the base of the mold. The separating tool 22*a* according to FIG. 8, comprises a block 43 positioned underneath the grid bars 7 and which may be raised and lowered in the direction of the double arrow 44. The portion 46 of the block 43 facing the molded body 14 has a plurality of vertical parallel blades 47 extending upwardly therefrom and formed with inclined upper edges, the blades 47 also being parallel to the grid bars 7. The spacing between these blades 47 is so dimensioned that they can be displaced into the clearances between adjacent grid bars 7. During the lifting movement of the block 43, the molded body 14 is separated from the grid bars 7 in a similar manner as with the aid of the tool 22 according to FIG. 7, in the following manner: separation takes place effectively in each case along a line which moves forward from right to left in the drawing in the longitudinal direction of the grid bars 7 and so shown in FIG. 8, until the entire molded body 14 rests on the inclined edges 45 of the blades 47** and is raised from the grid bars.

Figure 9:
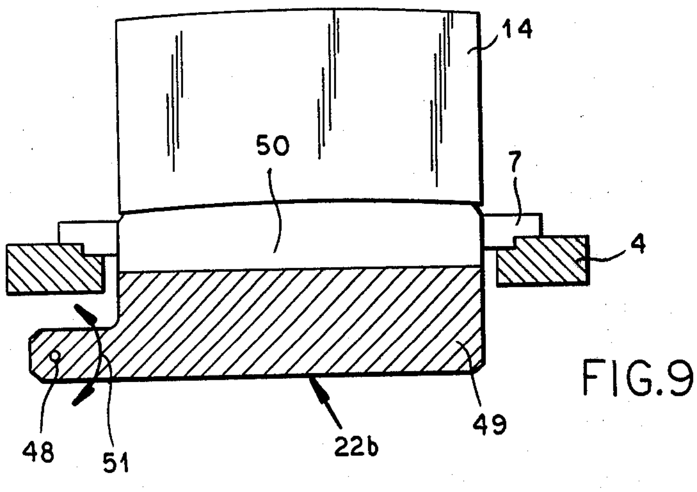
FIGS. 9 and 10 are diagrammatic views similar to FIGS. 7 and 8 showing a separating device in two different positions according to another embodiment of the invention.
Figure 10:
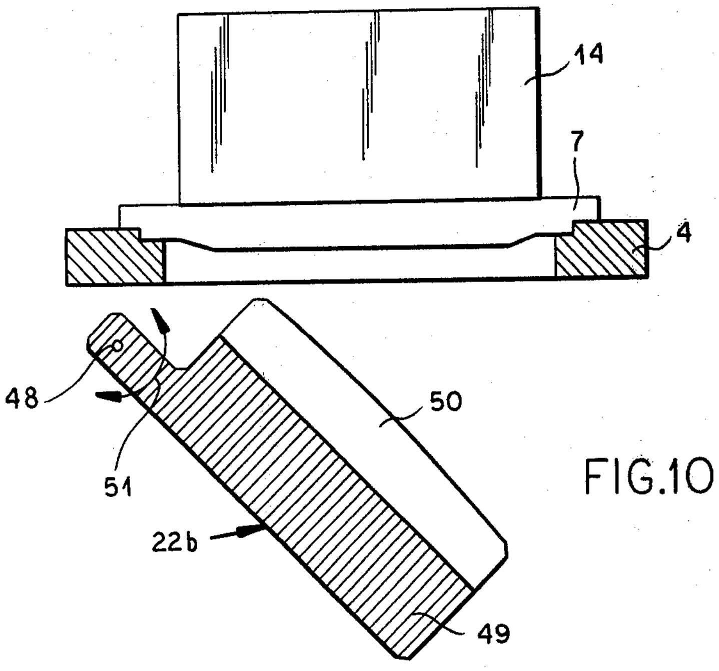

The embodiment according to the invention, as shown in FIGS. 9 and 10, acts in similar manner to the arrangement described according to FIG. 8, in which a separating tool **22*b* may be rotatable about a pivot 48. The separating tool 22*b* is formed of a block 49 having upwardly extending parallel blades 50, positioned beneath the grid bars 7 and formed with inclined leading edges having peaks in the center thereof. By pivoting the block 49 in the direction of the double arrow 51, the block may be transferred out of the position shown in FIG. 10 into the position shown in FIG. 9, while the blades 50 raise the molded body 14 during this movement starting from the center thereof, according to the view in FIGS. 9 and 10**.

In all of the cases described, a clearance is formed between the molded body and the grid bars, the clearance progressing along the surface of the molded body bearing on the grid bars, between the underside of the molded body 14 and the grid bars, so that separation of the molded body from the grid bars is always spatially restricted.

If separating tools are used which are supported by the grid bars during the removing of a molded body, the following must be considered.

Those parts of the separating tools, such as the wedge portions 28*b* of the plates 28 which are sliding on the grid bars during the removing of a molded body, should be formed as changeable parts of low wear-resistance in comparison to the grid bars. Its hardness must be lower than the hardness of the grid bars at the particular temperature during the removal of a molded body to avoid demaging of the grid bars by the separating tools.

The temperature during the removal of a molded body is essential in view of the pairing of the materials from which the separating tools and the grid bars are formed.

We claim:

1. A method of separating and removing a molded element, formed by firing and pyroplastic adhesion of the material to be fired, more particularly a clay which is capable of expanding, from the mold surrounding it, the said mold having a base formed by grid bars or otherwise penetrated to allow the material to be fired to be acted upon by hot gases flowing through the material, the said base having a support surface facing the material which is like a bar grid, and having a structure forming the side walls which is preferably separated from the said base, characterized in that the molded body is pressed upwards with plastic deformation and raised from the bars, in the region between its surfaces bearing on the bars or the profiling of the bars of the base, starting from one end of the bars and progressing longitudinally of the bars, thus forming a wedge-shaped and broadening clearance progressing along the surface bearing on the bars.

2. A method according to claim 1, characterized in that the molded body is subjected in its region between its surfaces bearing on the bars or the profiling of the bars of the base to the action of combined lifting and advancing forces and is released from the bars or the profiling of the bars of the base in the manner of a process of peeling them away from the bars or the profiling of the bars.

3. A method according to claim 1, characterized in that the molded body is raised from the bars in the manner of being lifted therefrom by the combined lifting and advancing forces acting on the molded body at its region between the bars when a mold having a base comprising grid bars is used.

4. A method according to any one of the preceding claims, characterized in that when using a mold having structures forming the side walls which are separate from the base it is raised initially in a direction which is normal to the base.

* * * * *